United States Patent
Stanchfield

(10) Patent No.: US 8,555,166 B2
(45) Date of Patent: Oct. 8, 2013

(54) DYNAMIC HYPERLINKING APPROACH

(75) Inventor: Scott Stanchfield, Germantown, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 635 days.

(21) Appl. No.: 11/438,520

(22) Filed: May 22, 2006

(65) Prior Publication Data

US 2007/0028190 A1 Feb. 1, 2007

Related U.S. Application Data

(60) Provisional application No. 60/683,099, filed on May 20, 2005.

(51) Int. Cl.
- G06F 3/048 (2013.01)
- G06F 3/00 (2006.01)
- G06F 17/00 (2006.01)
- G06F 15/00 (2006.01)

(52) U.S. Cl.
USPC ........... 715/719; 715/810; 715/802; 715/854; 701/428

(58) Field of Classification Search
USPC .......................... 715/810, 802, 854; 701/210
See application file for complete search history.

(56) References Cited

U.S. PATENT DOCUMENTS

| | | | |
|---|---|---|---|
| 5,612,881 A * | 3/1997 | Moroto et al. | 701/209 |
| 5,706,510 A * | 1/1998 | Burgoon | 707/203 |
| 5,781,772 A * | 7/1998 | Wilkinson et al. | 707/3 |
| 5,873,077 A * | 2/1999 | Kanoh et al. | 707/3 |
| 5,909,440 A * | 6/1999 | Ferguson et al. | 370/389 |
| 6,025,837 A * | 2/2000 | Matthews et al. | 715/721 |
| 6,222,532 B1 | 4/2001 | Ceccarelli | |
| 6,243,091 B1 * | 6/2001 | Berstis | 715/839 |
| 6,321,160 B1 * | 11/2001 | Takahashi | 701/209 |
| 6,466,234 B1 * | 10/2002 | Pyle et al. | 715/771 |
| 6,489,979 B1 | 12/2002 | Belknap et al. | |
| 6,526,215 B2 * | 2/2003 | Hirai et al. | 386/282 |
| 6,704,729 B1 * | 3/2004 | Klein et al. | 707/999.005 |
| 6,714,936 B1 * | 3/2004 | Nevin, III | 715/853 |
| 6,917,878 B2 * | 7/2005 | Pechatnikov et al. | 701/210 |
| 7,039,630 B2 * | 5/2006 | Shimazu | 707/706 |
| 7,062,490 B2 * | 6/2006 | Adya et al. | 707/10 |
| 7,139,983 B2 * | 11/2006 | Kelts | 715/802 |
| 7,321,824 B1 * | 1/2008 | Nesbitt | 701/201 |
| 7,328,214 B2 * | 2/2008 | Yuan et al. | 707/798 |

(Continued)

OTHER PUBLICATIONS

Hong-Yi Zeng et al., "On Fast Address-Lookup Algorithms", Jun. 1999, IEEE Journal on Selected Areas in Communications, vol. 17, pp. 1067-1082.*

(Continued)

*Primary Examiner* — Jordany Nunez
(74) *Attorney, Agent, or Firm* — Patent Portfolio Builders, PLLC

(57) ABSTRACT

A method of returning target scenes from a user link request is disclosed. The method comprises the steps of: receiving a user link request on a user interface; comparing the received user link request to a plurality of entries in a lookup table; for each entry in the plurality of entries in the lookup table that matches the received user link request, identifying a target scene that corresponds to the matched entry in the lookup table; determining a closest one of the target scenes if multiple entries in the lookup table match the user link request; and transitioning to the closest target scene.

12 Claims, 16 Drawing Sheets

(56) References Cited

U.S. PATENT DOCUMENTS

| | | |
|---|---|---|
| 2002/0054134 A1* | 5/2002 | Kelts .............................. 345/788 |
| 2002/0059603 A1* | 5/2002 | Kelts .............................. 725/47 |
| 2002/0159466 A1* | 10/2002 | Rhoades ....................... 370/408 |
| 2002/0175932 A1* | 11/2002 | Yu et al. ........................ 345/720 |
| 2003/0090506 A1* | 5/2003 | Moore et al. .................. 345/730 |
| 2003/0097357 A1 | 5/2003 | Ferrari et al. |
| 2003/0189588 A1* | 10/2003 | Girgensohn et al. .......... 345/723 |
| 2004/0070595 A1* | 4/2004 | Atlas et al. .................... 345/723 |
| 2004/0088678 A1* | 5/2004 | Litoiu et al. ................... 717/104 |
| 2004/0268393 A1 | 12/2004 | Hunleth et al. |
| 2005/0005241 A1 | 1/2005 | Hunleth et al. |
| 2005/0022139 A1* | 1/2005 | Gettman et al. .............. 715/850 |
| 2005/0071784 A1* | 3/2005 | Klein et al. ................... 715/851 |
| 2005/0114786 A1* | 5/2005 | Decombe ....................... 715/764 |
| 2005/0198574 A1 | 9/2005 | Lamkin et al. |
| 2005/0253806 A1 | 11/2005 | Liberty et al. |
| 2006/0010246 A1* | 1/2006 | Schulz et al. ................. 709/232 |

OTHER PUBLICATIONS

Lanthier et al., Approximating Shortest Paths on Weighted Polyhedral Surfaces, 2001, Algorithmica (New York), vol. 30, Iss. 4, p. 527-562.*

ARM architecture, http://en.wikipedia.org/wiki/ARM_architecture, Apr. 4, 2012.*

Arm Architecture, http://web.archive.org/web/20050407050615/http://en.wikipedia.org/wiki/ARM_architecture, Apr. 7, 2005.*

International Search Report for PCT/US06/19731 mailed Dec. 26, 2006.

Written Opinion for PCT/US06/19731 mailed Dec. 26, 2006.

* cited by examiner

DYNAMIC HYPERLINKING APPROACH

RELATED APPLICATIONS

This application claims the benefit of U.S. Provisional Patent Application No. 60/683,099 filed on May 20, 2005 and entitled "Dynamic Hyperlinking Approach", which is herein incorporated by reference in its entirety.

This application is also related to, and claims priority from, U.S. patent application Ser. Nos. 11/119,663 filed on May 2, 2005 entitled "Freespace Pointing Devices and Methods" (now U.S. Pat. No. 7,239,301 issued on Jul. 3, 2007 referred to herein as the '663 application) and Ser. No. 10/768,432, filed on Jan. 30, 2004 entitled "A Control Framework with a Zoomable Graphical User Interface for Organizing, Selecting and Launching Media Items" (referred to herein as the '432 application). The subject matter of each of these applications is incorporated in its entirety herein by reference.

BACKGROUND

The present invention relates, generally, to user interfaces and methods associated therewith and, more specifically, to navigation between user interface icons organized in a hierarchical manner.

User interfaces are ubiquitous in today's society. Computers, cell phones, fax machines and televisions, to name a few products, all employ user interfaces. User interfaces are intended to provide a mechanism for users to easily access and manipulate the, sometimes complex, functionality of the devices that they support. An example of a user interface is found in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference. Typically, such user interfaces employ remote, handheld devices to provide inputs to their respective applications.

User interfaces facilitate navigation within an increasingly complex array of choices in a home entertainment system for example. Objects or icons within a user interface may be organized logically in a hierarchical manner. A user may select an icon on a home entertainment system user interface to indicate his or her desire to watch TV, play computer games, access the internet, etc. via a monitor/display for example. Once the choice for watching TV is indicated, the user may be presented with icons (for selection) that represent broadcast channels, premium channels, sports channels, etc. Each of these icons may be actuated to provide additional levels of choices. For example, under broadcast channels, the network channels may be presented.

As the choices and levels of organization of the interface objects/icons increase, it would be desirable to transition between user choices in a rapid manner.

SUMMARY OF THE INVENTION

In one embodiment, a method of returning target scenes from a user link request is disclosed. The method comprises the steps of: receiving a user link request on a user interface; comparing the received user link request to a plurality of entries in a lookup table; for each entry in the plurality of entries in the lookup table that matches the received user link request, identifying a target scene that corresponds to the matched entry in the lookup table; determining a closest one of the target scenes if multiple entries in the lookup table match the user link request; and transitioning to the closest target scene.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Exemplary embodiments of the present invention provide a method for navigating between, and returning targets for, user selections on a user interface. More specifically, a "closest" target (from potentially multiple targets) is returned as described in more detail herein below. User interfaces as they pertain to exemplary embodiments are described first and specific exemplary methods for returning targets are then described.

Figure 1:
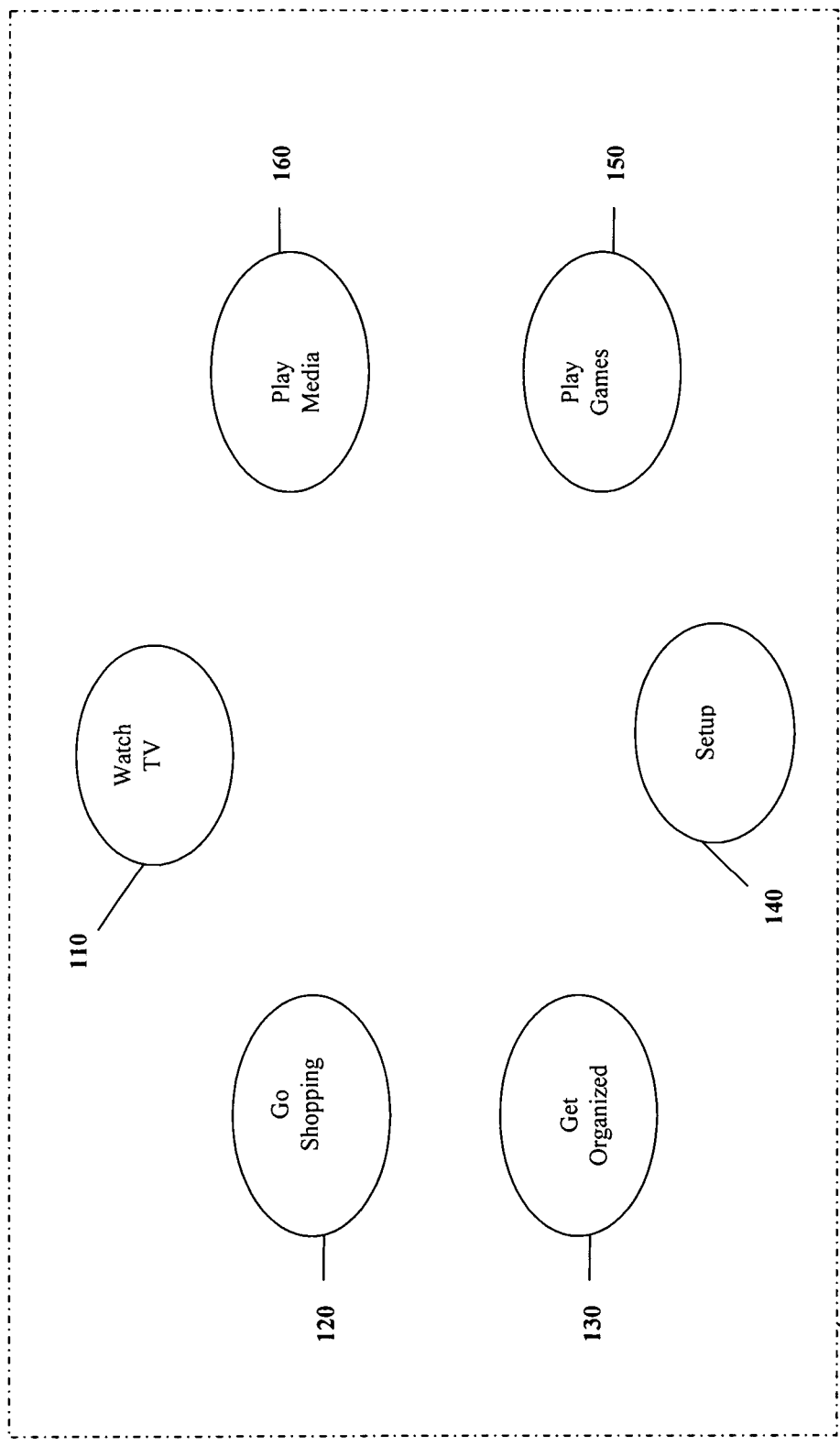
FIG. 1 depicts a user interface according to an exemplary embodiment of the present invention.

An exemplary user interface (UI) 100 is illustrated in FIG. 1. UI 100 may include a plurality of icons 110-160 each representing a choice for user selection. The user may highlight and depress (or "click") one of these icons such as icon 110 to indicate his or her preference for watching TV. A user input device may be utilized to perform this function. UI 100 may function as the home or root user interface.

Figure 6:
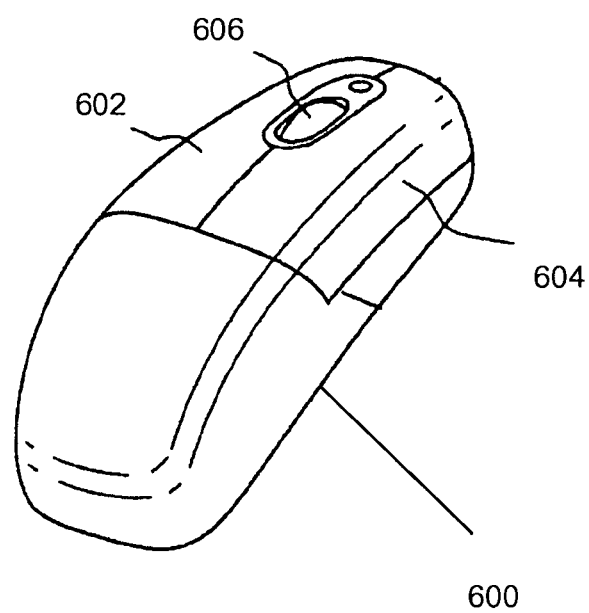
FIG. 6-7B illustrate exemplary free-space pointing devices.

An exemplary input device (or free-space pointing device) may resemble a mouse such as a wireless mouse 600 depicted in FIG. 6. Button presses on mouse 600 correspond to actuation of buttons 602 and 604 and scroll wheel 606 for example.

Figure 7A:
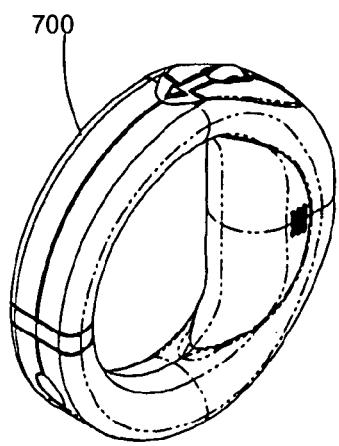
Figure 7B:
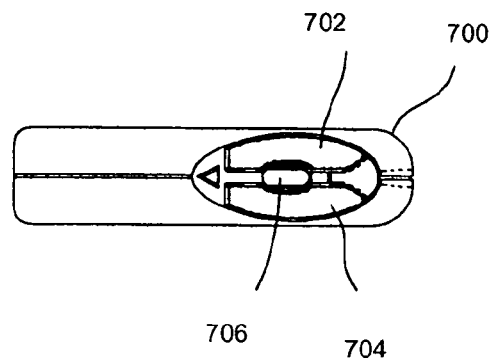

Another exemplary free-space pointing device 700 may resemble a loop-shaped device such as that illustrated in FIGS. 7A and 7B and designed by HillCrest Labs of Rockville, Md. Free-space pointing device 700 includes buttons 702 and 704 and scroll wheel 706 (corresponding to buttons 602 and 604 and scroll wheel 606 of FIG. 6).

Figure 2:
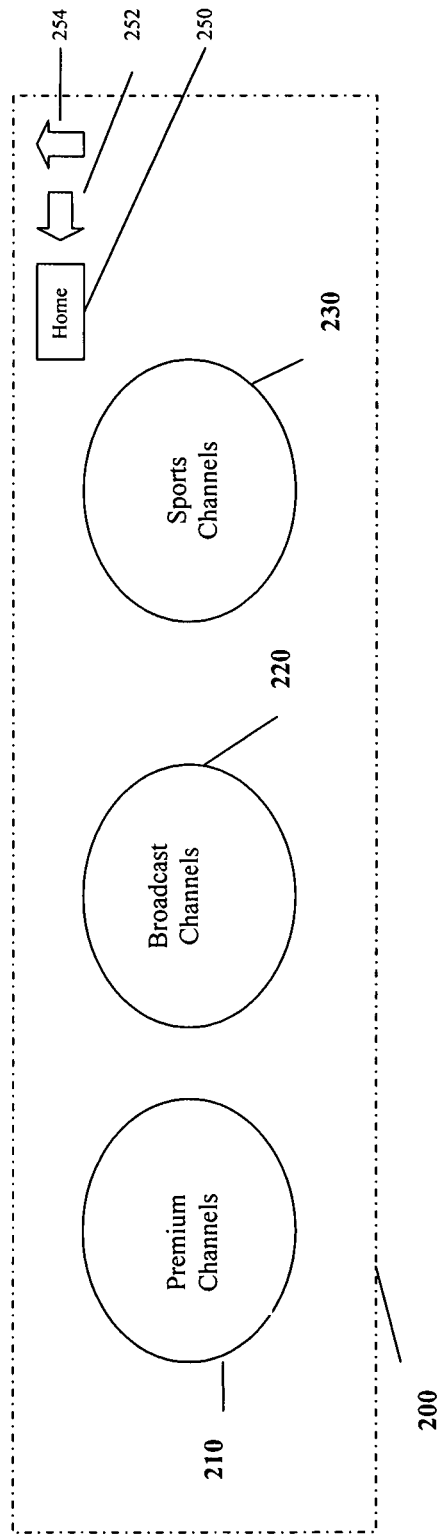
FIGS. 2-4 depict exemplary hierarchical levels of objects/icons in a user interface.

Referring back to FIG. 1, actuation of icon 110 may result in displaying UI 200 of FIG. 2. UI 200 may present choices under the "watch TV" category of FIG. 1. The choices may include icons 210-230 representing premium channels, broadcast channels and sports channels for example. UI 200 may also include navigational icons 250-254. Clicking on home icon 250 may result in return to UI 100 (or, "home") of FIG. 1 for example.

Figure 3:
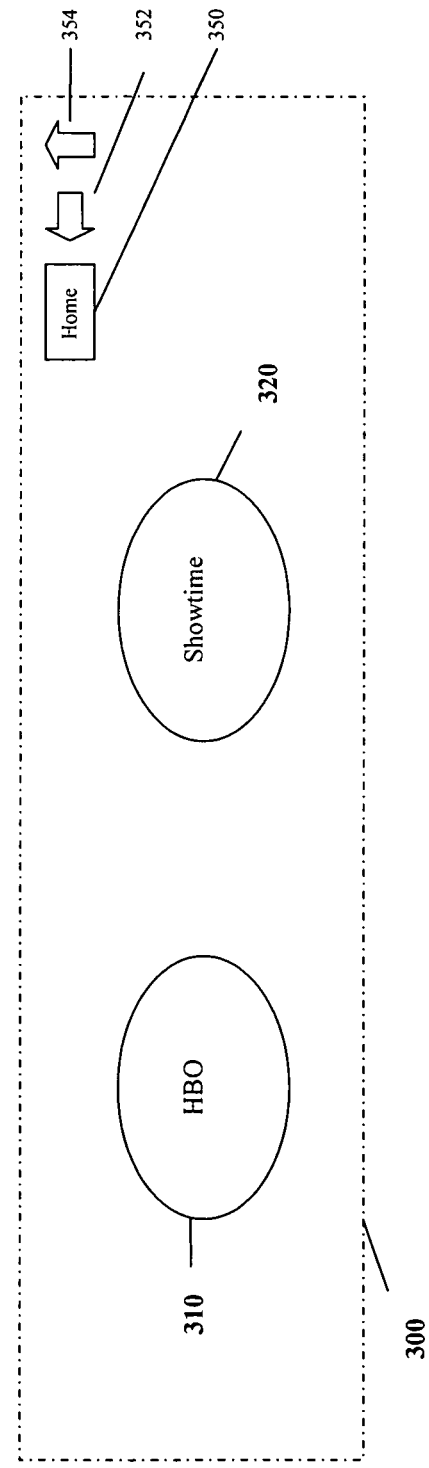

If a user chooses to watch premium channels, then actuation of icon 210 may result in displaying UI 300 of FIG. 3 which may include icons 310-320 corresponding to exemplary premium channels and navigational icons 350-354.

Figure 4:
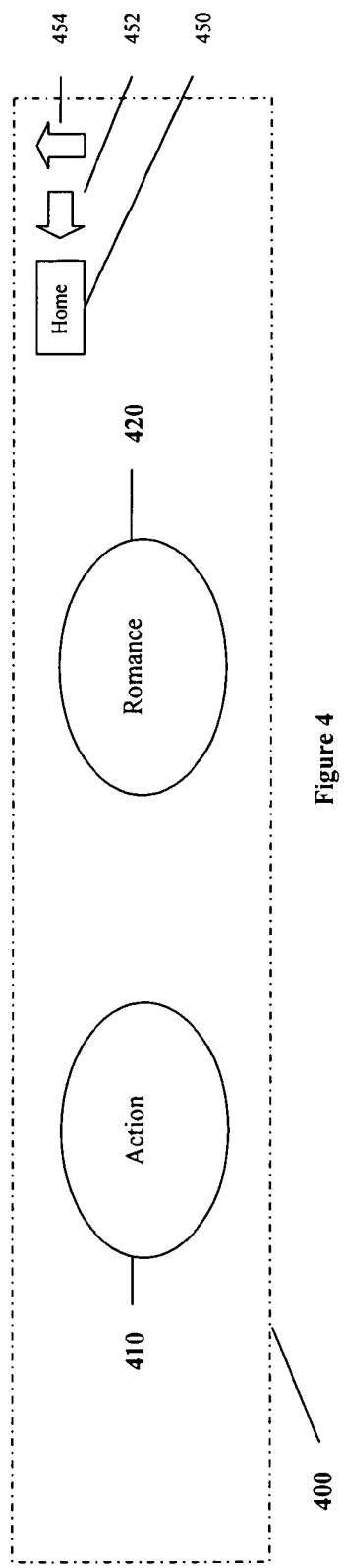
Figure 5A:
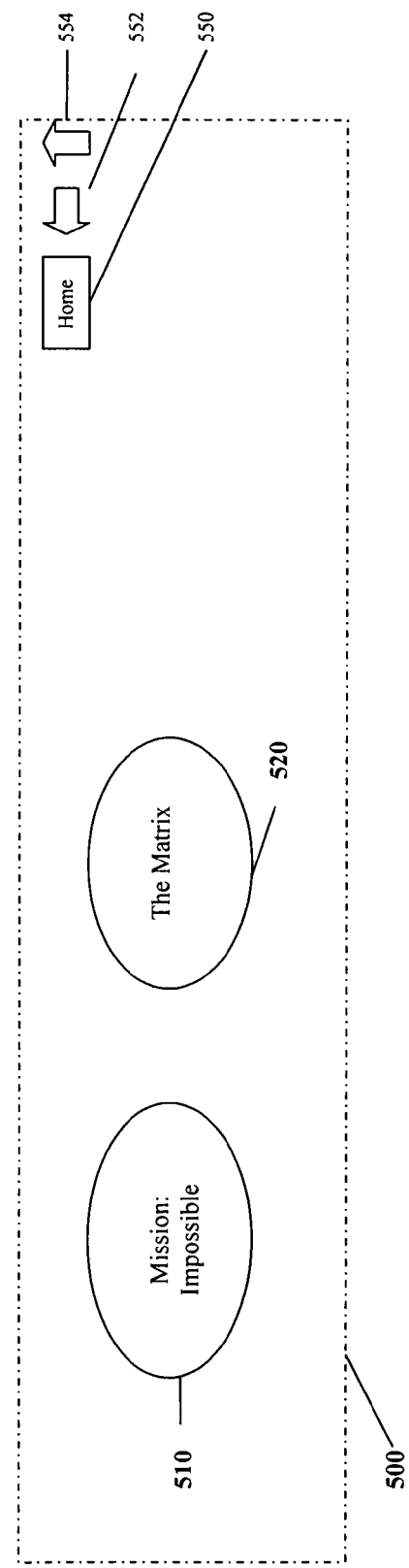
FIGS. 5A and 5B depict exemplary hierarchical level of objects/icons corresponding to the objects of FIG. 4.
Figure 5B:
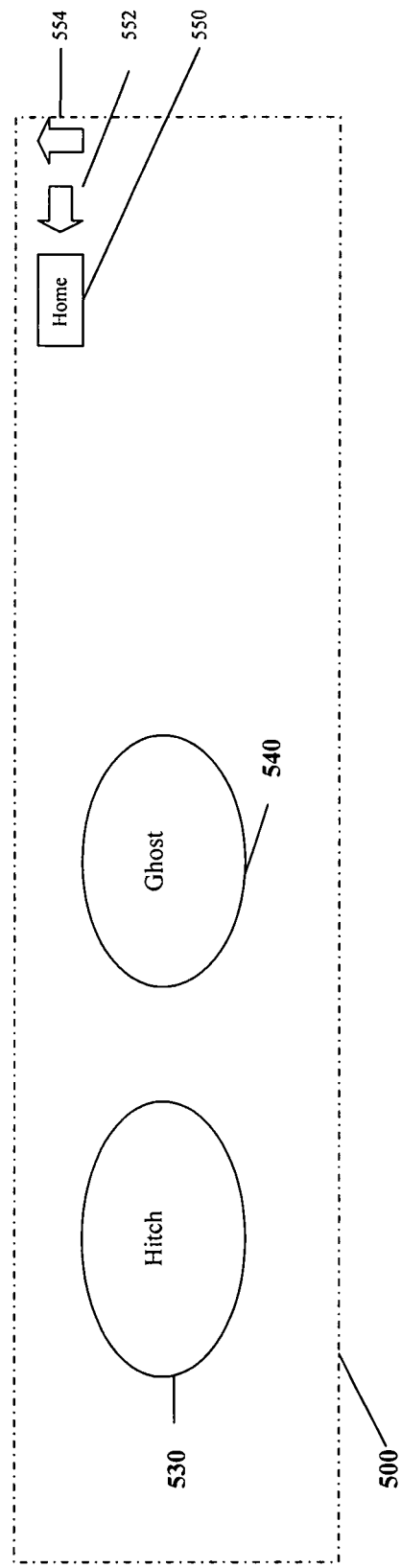

Actuation of icon 310 on UI 300 may result in displaying UI 400 of FIG. 4 which may include icons 410-420 corresponding to exemplary genres and navigational icons 450-454. Actuation of icons 410 and 420 may result in displaying UI 500 of FIGS. 5A and 5B respectively which may include icons 510, 520, 530 and 540 corresponding to exemplary movie titles and navigational icons 550-554. The movie titles are also exemplary and in some cases, such as "The Matrix Reloaded Preview" and "The Matrix—Behind Scenes", may be fictitious but may be based on actual movie titles and have been included for purely illustrative purposes.

Figure 8A:
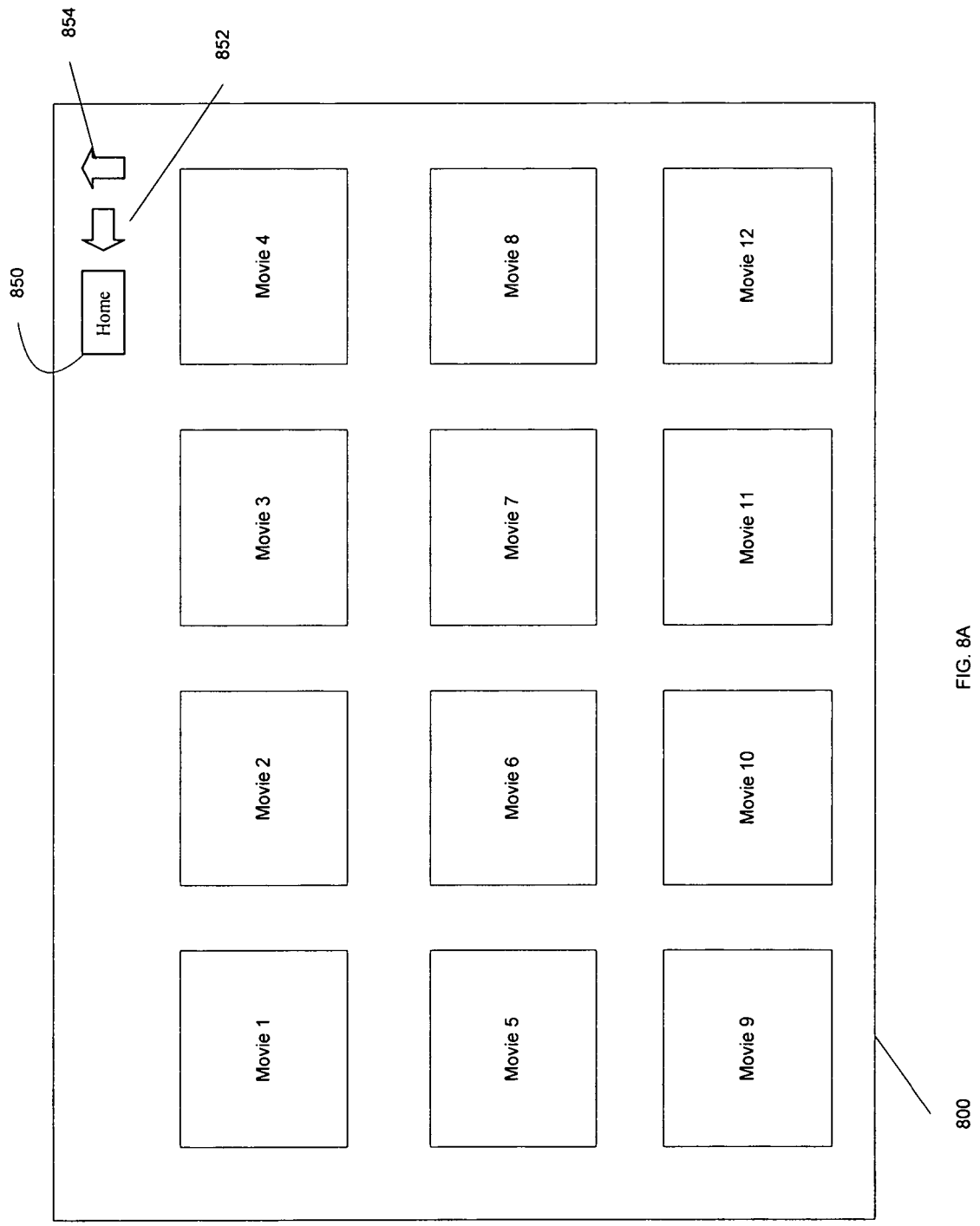
FIGS. 8A and 8B illustrate exemplary arrangement of icons on a user interface in accordance with an exemplary embodiment of the present invention.

While each of the icons are depicted as having an oval shape, they are not restricted to this shape. The icons may be rectangular, square, circle or any other shapes. The icons may also be arranged in multiple rows as illustrated in user interface 800 of FIG. 8A (in a rectangular shape) which also includes navigational icons 850, 852 and 854.

Figure 9:
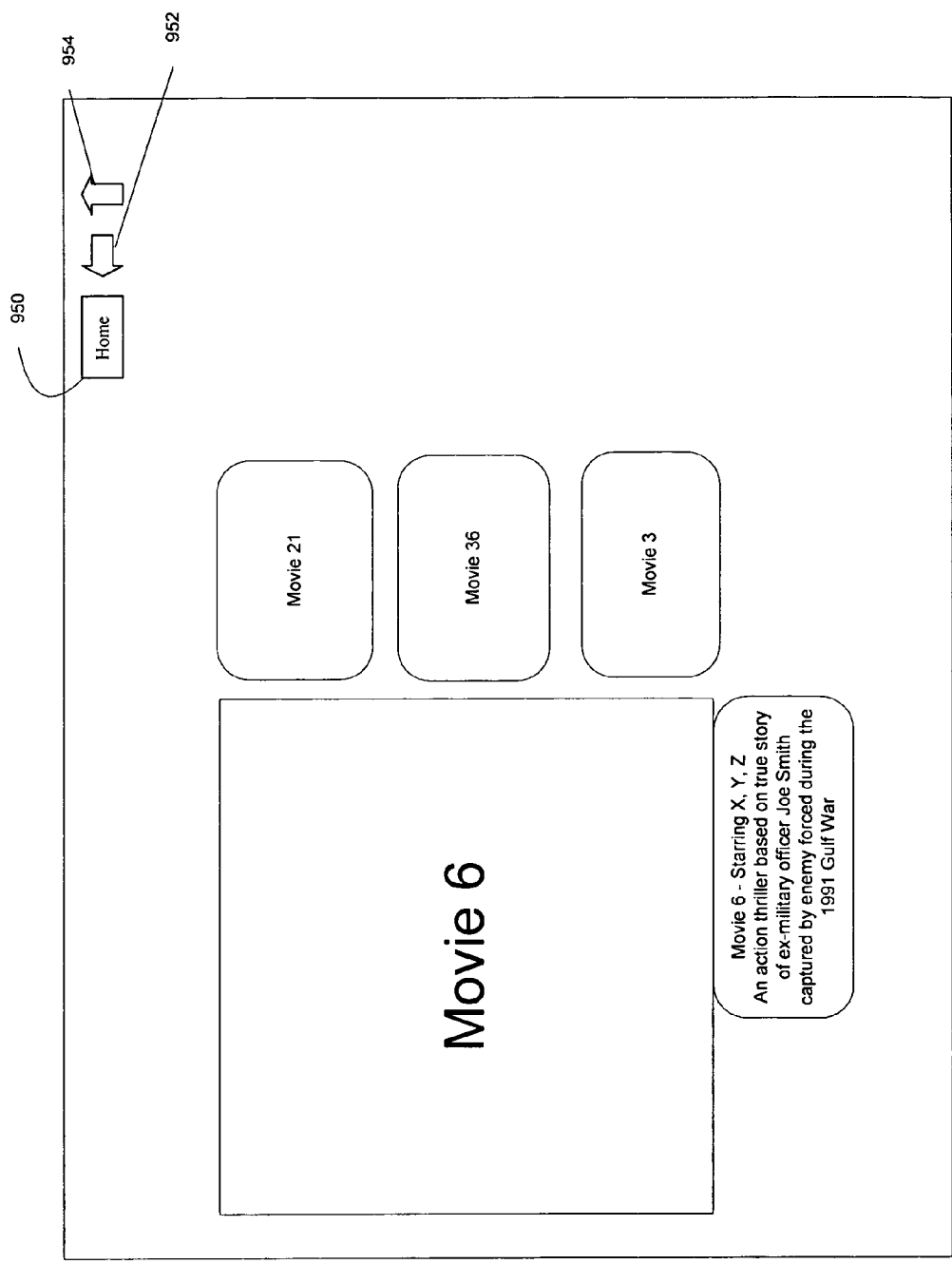
FIGS. 9 illustrate exemplary display of related information for a particular program on a user interface in an exemplary embodiment of the present invention.

For each movie title (FIG. 5A, 5B or 8A), the user may wish to view the movie;
the user may also be presented with a description of the movie and/or a list of related titles as illustrated on user interface 900 in FIG. 9 that also includes navigational icons 950, 952 and 954.

Figure 8B:
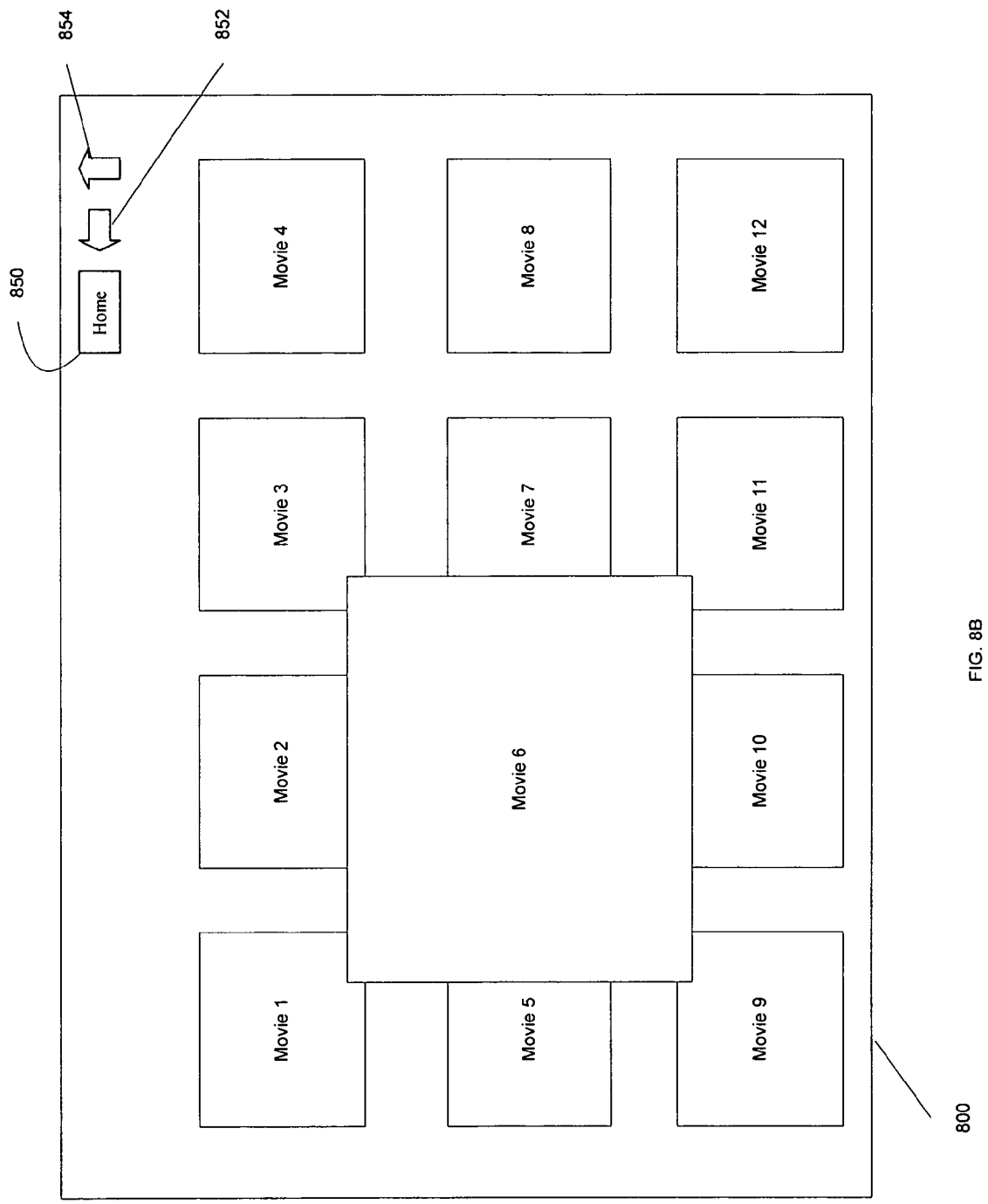

The user interface illustrated may be referred to as a zoomable user interface (ZUI) since highlighting one of a plurality of icons magnifies the highlighted icon in exemplary embodiments as illustrated in user interface 800 of FIG. 8B for example which also includes navigational icons 850, 852 and 854. The '432 application describes the zoomable aspect.

Figure 10:
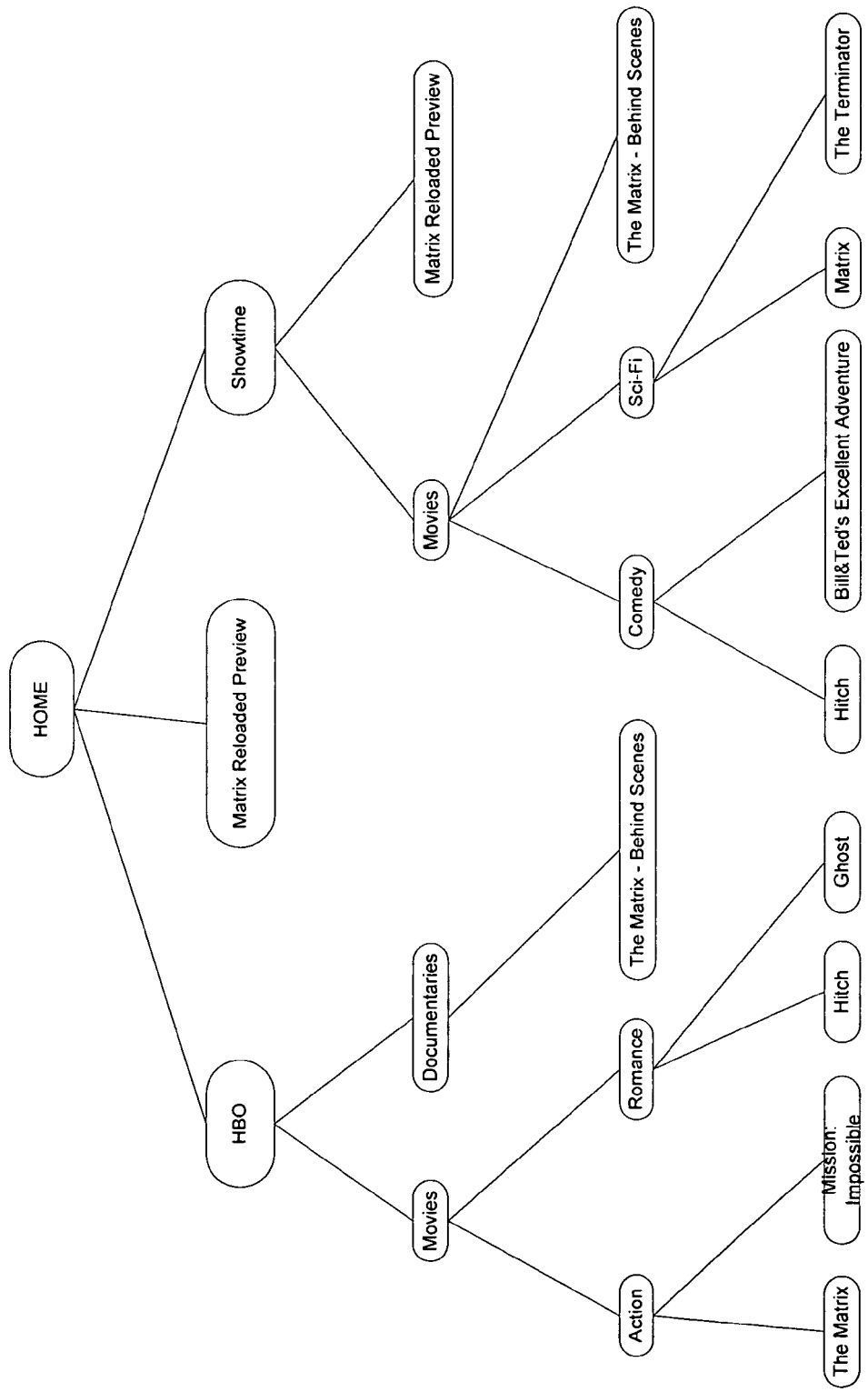
FIGS. 10-11B illustrate an exemplary hierarchical tree/node structure for programming information in an entertainment system in exemplary embodiment of the present invention.

An overall exemplary hierarchical structure for the icons of FIGS. 1-5B is illustrated as nodes in a tree in FIG. 10. For the purposes of this invention, each node may be referred to as a scene. The illustration of FIG. 10 is purely illustrative and not exhaustive. In implementation, several additional networks may be available (i.e. besides HBO® and SHOWTIME®); for each network, additional genres may be available and for each genre, additional movie titles (besides the two that are illustrated) may be available.

The language definition for each scene is represented as a scalable vector graphic (SVG). SVGs are used as they describe shapes on a display page, movements on a display page and location of graphics as they appear on a display page within a graphical display.

Programming information for a particular channel/network may be received by the server from the respective network on a periodic basis. Such programming may be dynamic in nature. That is, a movie title under the action genre for HBO for one period (a week or a month) may differ from a movie title under the action genre for HBO for a second period.

Each of the nodes/scenes may have a unique description or definition that may be stored in a server. The scene definition therefore may rely on information received from the networks. The scene representing "The Terminator" in FIG. 10 may have the exemplary definition: home\SHOWTIME\movies\sci-fi\The Terminator.

The scene representing "The Matrix" may have the following two exemplary definitions since The Matrix occurs twice: home\SHOWTIME\movies\sci-fi\The Matrix and home\HBO\movies\action\The Matrix.

The definition in this exemplary embodiment may be in a folder/subfolder type of hierarchy. Other formats may also be used to define the scenes. The definition for a scene may be viewed as the path from the home location to the scene location. The server may store a description (or definition) for all scenes that are currently available.

In the example described above, a plurality of generic identifiers may be assigned under the genre. The generic identifiers may be termed as movie-0, movie-1, . . . movie-n. The generic identifiers may have different movies associated with them based on programming for a particular time period. For the month of November 2005 for example, movie-0 may correspond to "The Matrix" and movie-1 may correspond to "Mission: Impossible" In April 2006, movie-0 may correspond to "Spiderman" and movie-1 may correspond to "Mission: Impossible II".

Each of the program titles (such as "Mission: Impossible" and "The Matrix") may have unique identification associated therewith such as a numeric or an alphanumeric code for example. Such identification may be included in metadata corresponding to the movie and may be received or known by the server.

A user highlighting "The Matrix" under HBO\Movies\Action, for example, may also be presented with related titles. The related titles/movies may be those having similar story lines, genre or those having common actors, etc. The related titles/movies may also be included in the metadata received by the server.

A user wishing to obtain information (such as a preview clip or description) or to view/play a related movie may click on an icon representing the related movie (movie 21, movie 36, etc. of FIG. 9). This may serve as a user link request. The request for information on and for viewing of the related movie (movie 21 for example) may be represented on the movie 21 icon for example.

For each movie title or program available on the server, an entry may be created in a lookup table based on an identification generated by the server representing a user link request. Separate entries may be created for each aspect of a particular title. The separate aspects may be movie information (such as preview) and movie play for example. For each of these entries, a location (i.e. path of a scene described above) where the desired information such as movie information or movie play (a "target scene") may be found may be listed in the corresponding column.

Because a particular user link request may have multiple resulting scenes, the link request may be listed multiple times in the table—each having a different corresponding resulting scene or path.

During runtime (i.e. while the user is navigating the user interface), a link request received from a user may be searched for in the table. If the received link request matches an entry in the table, the corresponding location information is obtained. If multiple entries match the received link request, then the information for multiple corresponding locations (each corresponding to one of the multiple entries) is obtained and the closest one of these corresponding locations is selected using an algorithm described below.

During runtime, using the exemplary setup illustrated in FIG. 10, if a user seeks information on related movies from "The Matrix" under Home\HBO\Movies\Action for example, the server may provide the two choices in the example illustrated in FIG. 10 ("The Matrix Reloaded Preview" and "The Matrix—Behind Scenes").

For "The Matrix Reloaded Preview", there are two potential resulting scenes. The scenes in this example have the paths Home\The Matrix Reloaded Preview and Home\SHOWTIME\The Matrix Reloaded Preview. A scene representing "The Matrix—Behind Scenes" may be Home\HBO\Documentaries\The Matrix—Behind Scenes or Home\SHOWTIME\Movies\The Matrix—Behind Scenes.

If the user chooses "The Matrix Reloaded Preview" for example, the server computes the shortest distance to "The Matrix Reloaded Preview" from the current scene.

In determining the shortest distance, the server attempts to minimize the number of steps or levels that have to be traversed up (i.e. go up as little as possible). This may be accomplished by picking the target having the longest common prefix (as it relates to the scene definition or path) with the current scene.

Then, it attempts to minimize the number of steps or levels that have to be traversed down (i.e. go down as little as possible). For the "going down" part, the server examines paths to each possible target and selects the path having the fewest "\" in exemplary embodiments.

In the example above, if the chosen scene is "The Matrix Reloaded Preview", the current location/scene is Home\HBO\Movies\Action\The Matrix. The two possible destination scenes may be Home\SHOWTIME\The Matrix Reloaded Preview and Home\The Matrix Reloaded Preview. The common prefix for the current scene and the first destination scene is Home. The common prefix for the current scene and the second destination scene is also Home.

Both destination scenes in this example have the same length common prefixes with respect to the current scene. This implies that the same number of levels have to be traversed up regardless of either destination scenes. However, the number of levels to traverse down from Home varies between the destination scenes. For the first destination scene, two levels have to be traversed. For the second destination scene, only one level has to be traversed down. In this case, the server chooses the second destination (i.e. Home\The Matrix Reloaded Preview).

If the user chooses "The Matrix—Behind Scenes", then the two destination scenes may be Home\HBO\Documentaries\The Matrix—Behind Scenes or Home\SHOWTIME\Movies\The Matrix—Behind Scenes. In this scenario the current scene (i.e. Home\HBO\Movies\Action\The Matrix) has a longer common prefix with Home\HBO\Documentaries\The Matrix—Behind Scenes than with Home\SHOWTIME\Movies\The Matrix—Behind Scenes. The server then chooses the first destination scene.

Figure 11A:
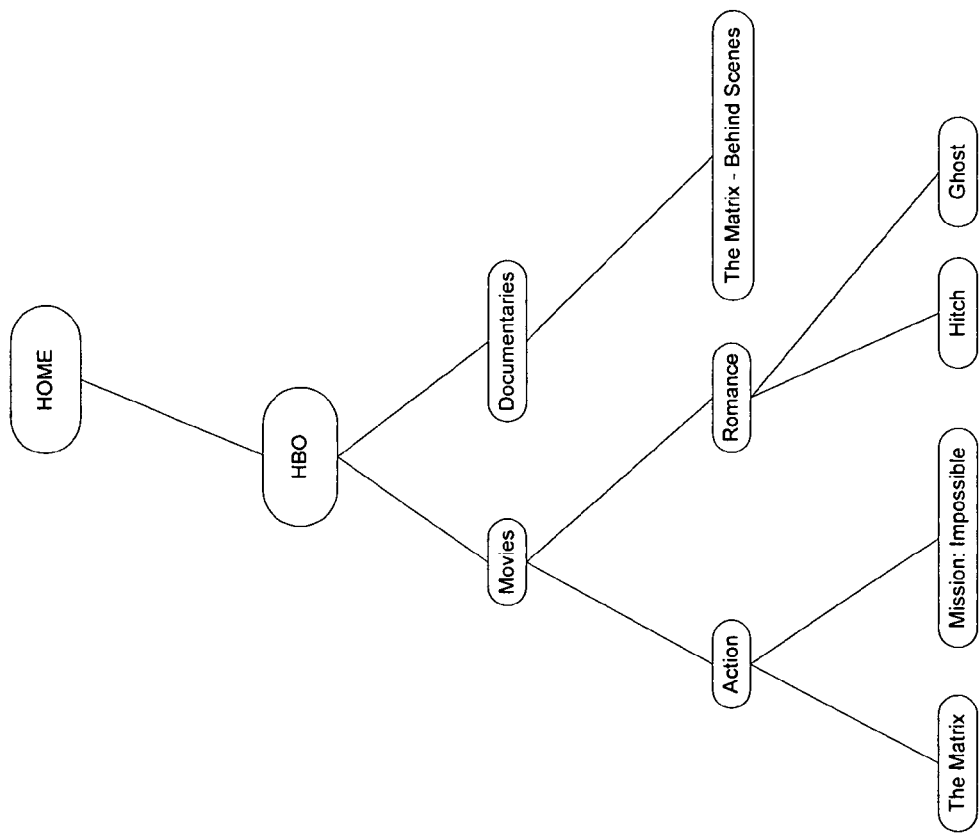

If only one destination scene is available, then the shortest distance need not be determined and the one destination scene may be selected. As illustrated in FIG. 11A, from "The Matrix", a user's desire for background information results in only one scene corresponding to "The Matrix—Behind Scenes". This destination may then be selected.

Figure 11B:
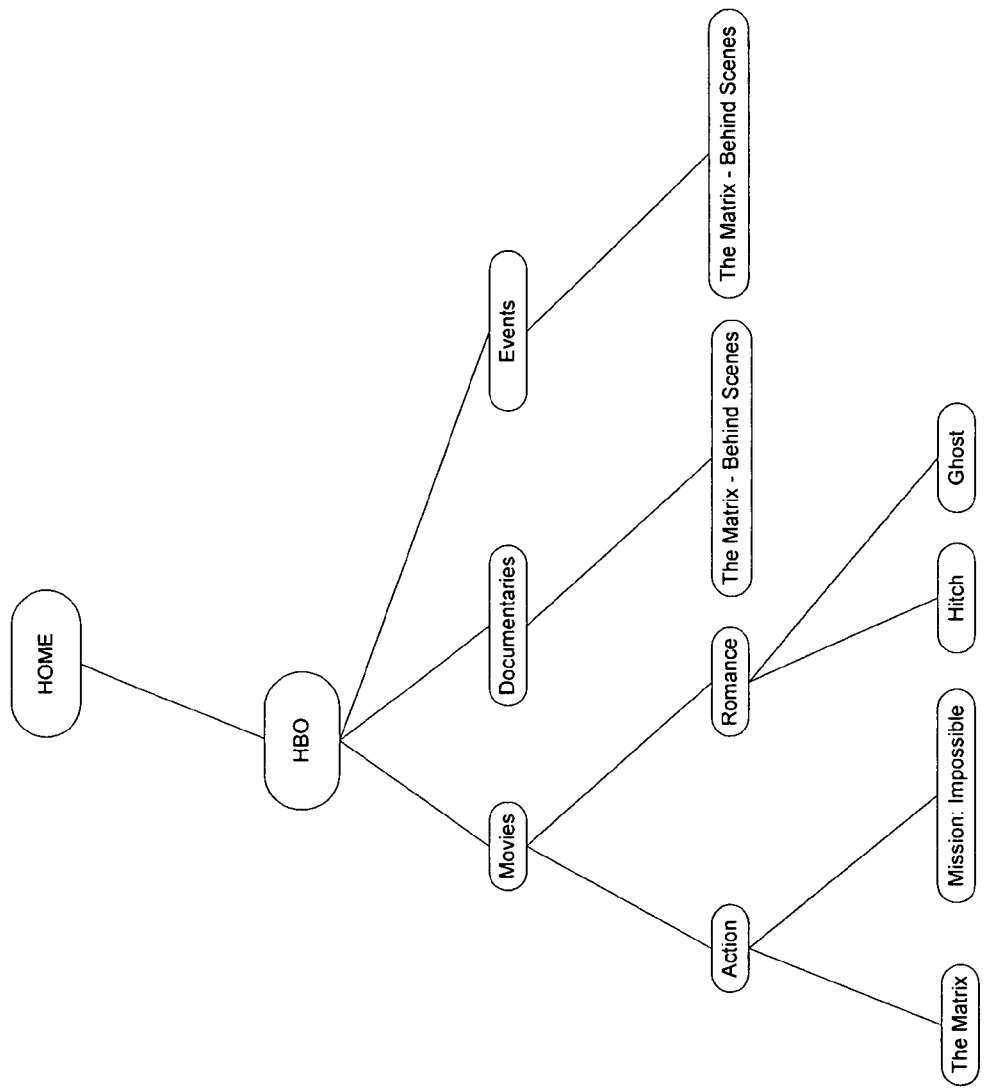
Figure 12A:
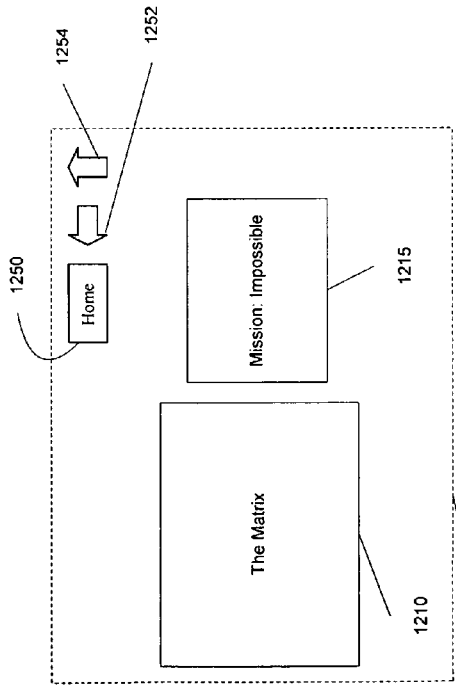
FIGS. 12A-12F illustrate an exemplary transitioning sequence on a user interface between scenes in accordance with an exemplary embodiment of the present invention.
Figure 12B:
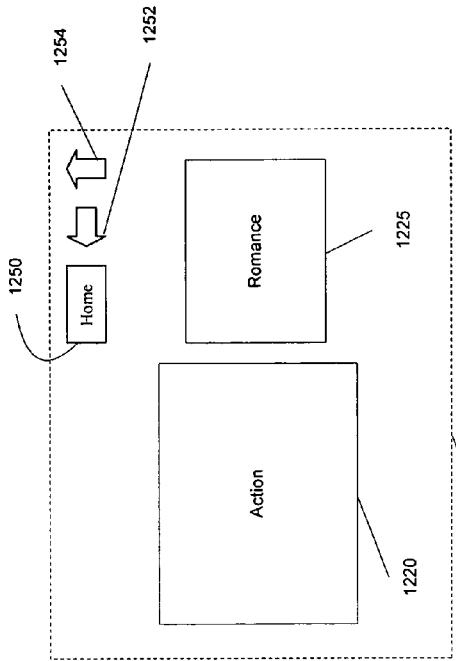
Figure 12C:
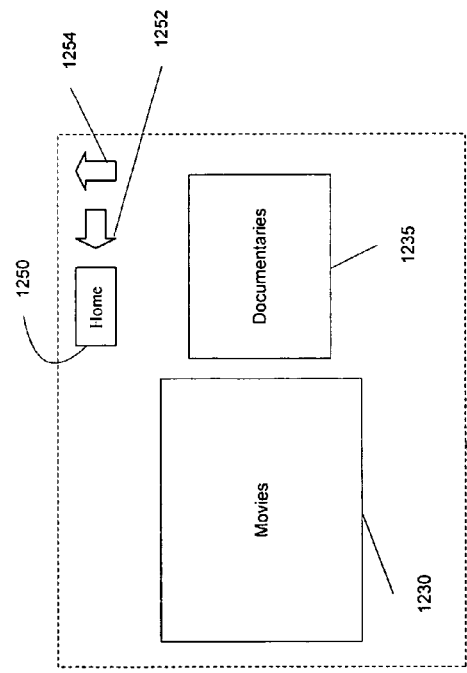
Figure 12D:
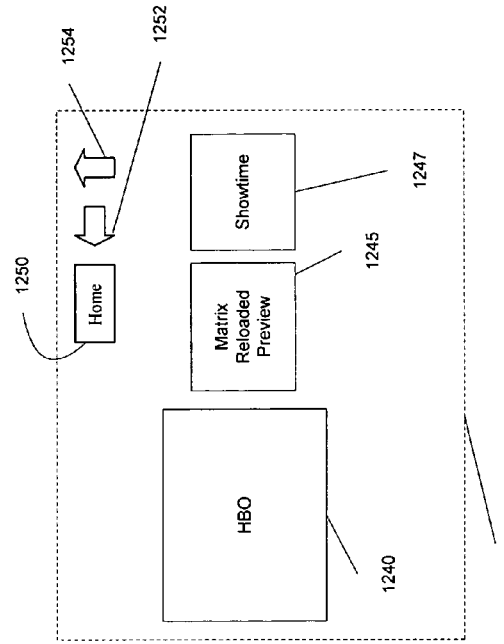
Figure 12E:
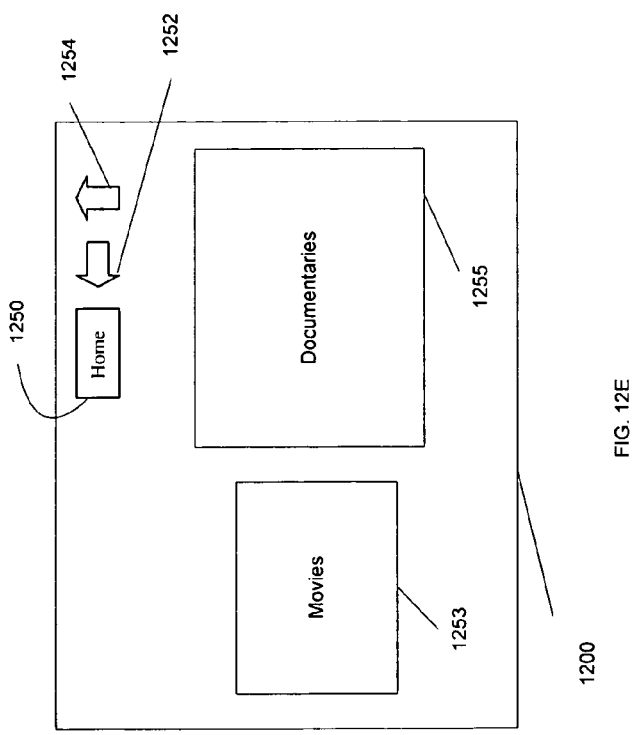
Figure 12F:
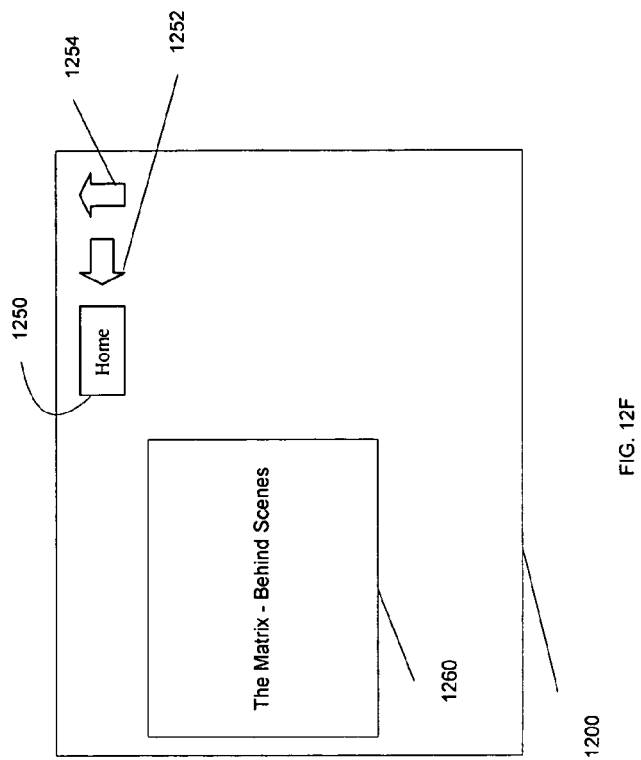

If the distance to multiple destinations is identical, then any one of the destinations may be selected. As illustrated in FIG. 11B, from "The Matrix", a user's desire for background information results in two scenes corresponding to "The Matrix—Behind Scenes" (HBO\Documentaries\The Matrix—Behind Scenes and HBO\Events\The Matrix—Behind Scenes). In this scenario, either of the destination scenes may be selected.

The transition from the source scene to the destination scene may be visually presented on the user interface utilizing the zoomable aspect of the user interface. That is, for example, the transition from Home\HBO\Movies\Action\The Matrix to Home\HBO\Documentaries\The Matrix—Behind Scenes in FIG. 10 may be displayed as a series of transitioning sequence interfaces 1200 illustrated in FIGS. 12A-12F.

At each stage of the transitioning sequence, the scene of interest (1210, 1220, 1230, 1240, 1253 and 1260) or relevance may be displayed more prominently on the user interface 1200 than other scenes (1215, 1225, 1235, 1245, 1247 and 1255) at that hierarchical level (illustrated in FIG. 10). The navigational icons 1250, 1252 and 1254 appears in the user interface as well.

Navigational icons illustrated in each of FIGS. 2-5B facilitate navigation to home (icon 550 for example), up one level (icon 554) or to previous scene (icon 552).

Figure 13:
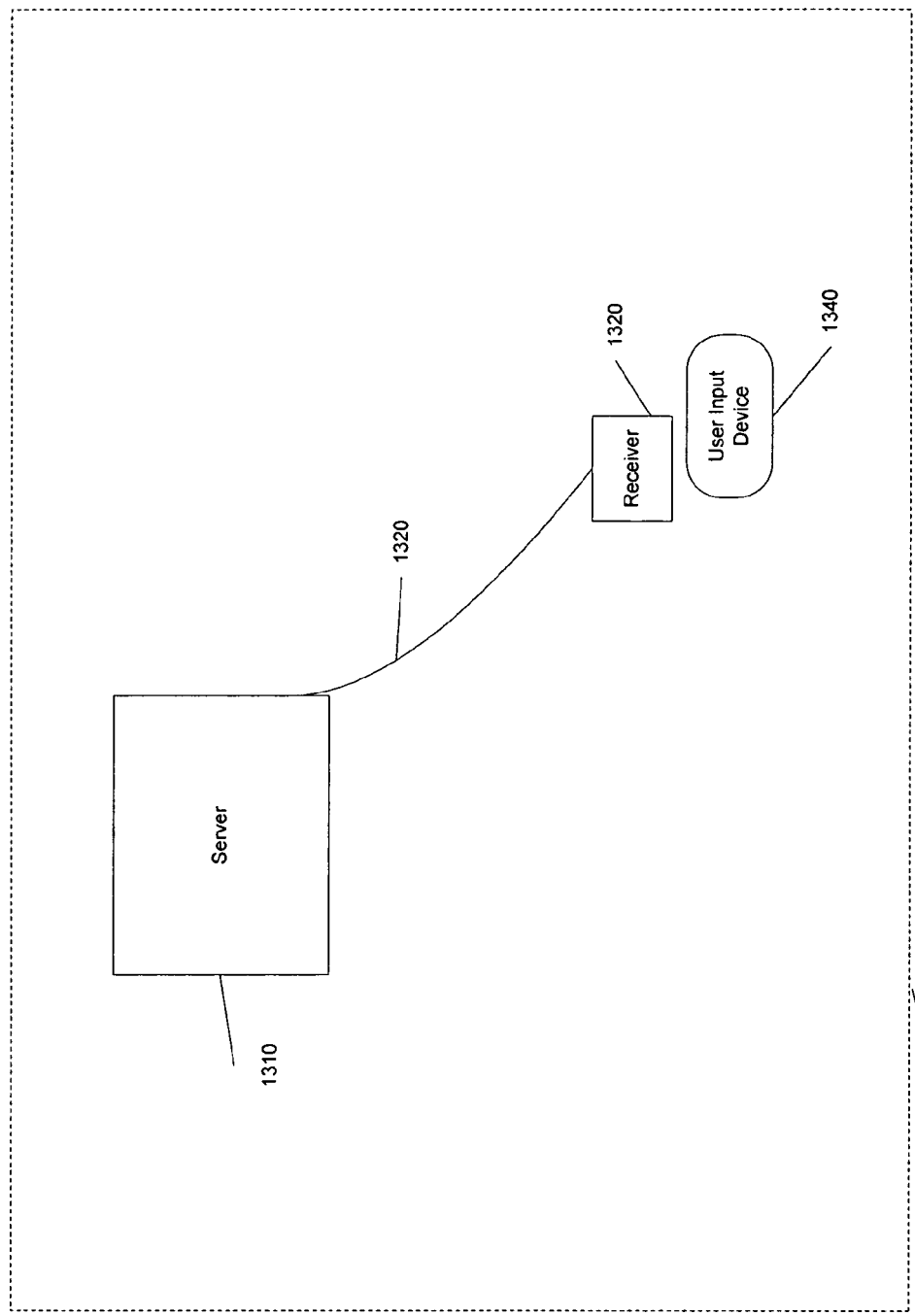
FIG. 13 illustrates an exemplary system of the present invention.

The methods described herein may be implemented using known Java techniques. The server may be remotely located and user interaction via a handheld device may be facilitated over a network connecting a receiver (receiving user actuation from the handheld device) to the server. An exemplary system 1300 is illustrated in FIG. 13. System 1300 includes a server 1310, a network 1320, a receiver 1330 and a handheld device 1340. Communication between the handheld device 1340 and the receiver 1330 may be over wireless medium such as Bluetooth for example.

Figure 14:
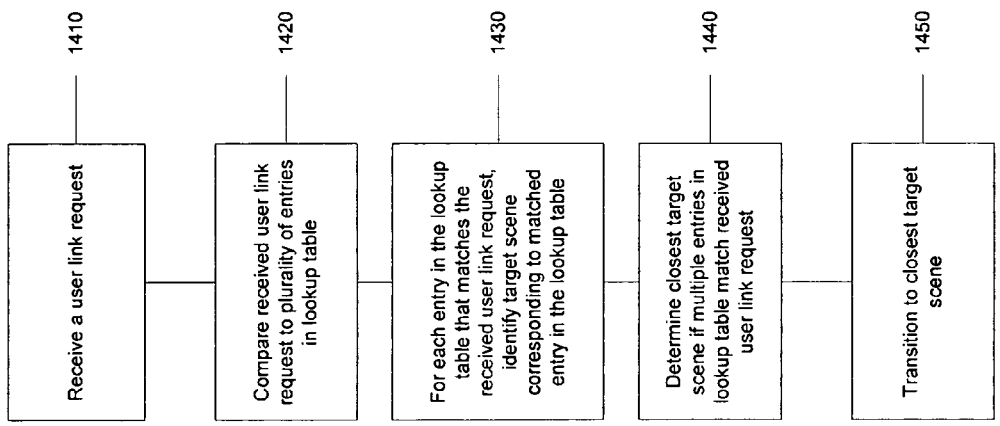
FIG. 14 illustrates an exemplary method of the present invention.

Exemplary methods described above may be illustrated with reference to FIG. 14. A user link request may be received at 1410. The received request is compared to a plurality of entries in a lookup table at 1420. For each entry in the plurality of entries in the lookup table that matches the received user link request, a target scene that corresponds to the matched entry in the lookup table is identified at 1430. A closest one of the target scenes is determined if multiple entries in the lookup table match the user link request at 1440. The closest target scene is transitioned to at 1450.

The above-described exemplary embodiments are intended to be illustrative in all respects, rather than restrictive, of the present invention. Thus the present invention is capable of many variations in detailed implementation that can be derived from the description contained herein by a person skilled in the art. For example, while the description focused on navigating between programs in multiple locations in a home entertainment system, exemplary embodiments may be equally applicable for determining a closest branch of a retail chain having multiple locations that is within a same jurisdiction for ensuring a particular sales tax rate.

All such variations and modifications are considered to be within the scope and spirit of the present invention as defined by the following claims. No element, act, or instruction used in the description of the present application should be construed as critical or essential to the invention unless explicitly described as such.

What is claimed is:
1. A method for performing a transition between scenes associated with a user interface for the selection of video programs, the method comprising:
displaying a first scene associated with a selected video program on the user interface;
presenting a link request with the first scene which link request represents another video program that is related to the selected video program of the first scene;
selecting the link request on the user interface;
determining a target scene and a path to the target scene based at least in part on the step of selecting the link request on the user interface;

displaying at least one transition sequence interface associated with the path between the first scene and the target scene; and displaying the target scene;

wherein the selected video program of the first scene and the video program represented by the link request have at least one of similar story lines, similar genre and common actors.

2. The method of claim 1, wherein the step of displaying at least one transition sequence interface associated with the path between the first scene and the target scene further comprises:

displaying a plurality of transition sequence interfaces associated with the path between the first scene and the target scene; and displaying a scene of interest more prominently on the user interface than other scenes at a same hierarchical level.

3. The method of claim 1, wherein the step of determining a target scene based at least in part on the step of selecting the link request on the user interface further comprises:

comparing the link request to a plurality of entries in a lookup table;

for each entry in the plurality of entries in the lookup table that matches the received user link request, identifying a target scene that corresponds to the matched entry in the lookup table; and determining a closest one of the target scenes if multiple entries in the lookup table match the link request.

4. The method of claim 1, further comprising:

using a scalable vector graphic as a language definition for each of the first scene and the target scene.

5. The method of claim 1, wherein each of the first scene and the target scene have a unique description.

6. The method of claim 5, wherein the unique description for the first scene describes a path from a home node to the first scene and the unique description for the target scene describes a path from the home node to the target scene.

7. The method of claim 1, wherein the first scene is a subset of a genre.

8. The method of claim 7, wherein the genre includes a plurality of generic identifiers, further wherein each of the plurality of generic identifiers has a different movie associated with its generic identifier for a particular time period.

9. The method of claim 1, wherein the first scene has a first identification which is a portion of a metadata and the target scene has a second identification which is a different portion of the metadata.

10. The method of claim 9, wherein the first identification is associated with a movie.

11. The method of claim 10, wherein the metadata includes information associated with related titles to the movie.

12. A method for performing a transition between scenes associated with a user interface for the selection of video programs, the method comprising:

displaying a first scene associated with a selected video program on the user interface;

presenting a link request with the first scene which link request represents another video program that is related to the selected video program of the first scene;

selecting the link request on the user interface;

determining a target scene based at least in part on the step of selecting the link request on the user interface;

displaying at least one transition sequence interface associated with a hierarchical path of scenes between the first scene and the target scene, wherein the at least one transition sequence interface comprises each scene in the hierarchical path of scenes; and displaying the target scene;

wherein the selected video program of the first scene and the video program represented by the link request have at least one of similar story lines, similar genre and common actors.

* * * * *